(12) United States Patent
Samaranayake et al.

(10) Patent No.: US 6,521,343 B1
(45) Date of Patent: Feb. 18, 2003

(54) CATIONIC CORE-SHELL PARTICLES WITH STABILIZER-CONTAINING ACID-SWELLABLE SHELLS

(75) Inventors: Gamini S. Samaranayake, Mount Pleasant, SC (US); G. Frederick Hutter, Charleston, SC (US); Camille K. Stebbins, Charleston, SC (US)

(73) Assignee: Westvaco Corporation, Stamford, CT (US)

( * ) Notice: Subject to any disclaimer, the term of this patent is extended or adjusted under 35 U.S.C. 154(b) by 0 days.

(21) Appl. No.: 10/194,352

(22) Filed: Jul. 12, 2002

Related U.S. Application Data

(63) Continuation-in-part of application No. 10/147,655, filed on May 16, 2002.

(51) Int. Cl.[7] .............................. B32B 5/16; G03C 1/72
(52) U.S. Cl. ....................... 428/407; 430/138; 525/288; 525/902
(58) Field of Search .................. 428/407; 525/288, 525/902; 430/138

(56) References Cited

U.S. PATENT DOCUMENTS

| | | | | |
|---|---|---|---|---|
| 4,434,267 A | * | 2/1984 | Maslanka et al. | 524/458 |
| 4,460,637 A | | 7/1984 | Miyamoto et al. | |
| 4,636,805 A | | 1/1987 | Toganoh et al. | |
| 4,916,171 A | | 4/1990 | Brown et al. | |
| 4,926,190 A | | 5/1990 | Laver | |
| 5,096,781 A | | 3/1992 | Vieira et al. | |
| 5,100,951 A | * | 3/1992 | Fillipo et al. | 524/501 |
| 5,124,723 A | | 6/1992 | Laver | |
| 5,132,383 A | * | 7/1992 | Larson et al. | 526/292.2 |
| 5,212,251 A | * | 5/1993 | Lorah et al. | 525/279 |
| 5,372,884 A | | 12/1994 | Abe et al. | |
| 5,478,631 A | | 12/1995 | Kawano et al. | |
| 5,609,980 A | * | 3/1997 | Matthews et al. | 430/138 |
| 5,708,093 A | * | 1/1998 | Bastelberger et al. | 525/288 |
| 5,891,229 A | | 4/1999 | Nohr et al. | |
| 5,928,830 A | * | 7/1999 | Cheng et al. | 430/137 |
| 6,010,790 A | | 1/2000 | Chen et al. | |
| 6,248,805 B1 | * | 6/2001 | Nguyen et al. | 523/160 |
| 6,312,807 B1 | | 11/2001 | Luwig et al. | |
| 6,348,541 B1 | * | 2/2002 | Kanda et al. | 524/753 |
| 6,417,249 B1 | * | 7/2002 | Nguyen et al. | 523/201 |

FOREIGN PATENT DOCUMENTS

| | | |
|---|---|---|
| EP | 0875544 | 4/1998 |
| EP | 1006161 | 6/2000 |

* cited by examiner

*Primary Examiner*—H. Thi Le
(74) *Attorney, Agent, or Firm*—Daniel B. Reece, IV; Terry B. McDaniel; Richard L. Schmalz

(57) ABSTRACT

This invention concerns cationic core-shell particles having an acid-insoluble polymeric core component and an acid-swellable polymeric shell component disposed generally about said core so that upon neutralizing said shell with acid, a portion of said shell remains attached or associated with said core; and wherein said shell contains a stabilizer that is covalently bonded to the polymeric shell component. This invention further concerns polymer latex compositions wherein said polymeric shell component has been neutralized and substantially, but not totally, dissolved so as to form a blend of neutralized core-shell polymer and an aqueous solution of neutralized shell polymer. More particularly, the invention concerns the use of latex compositions produced from these cationic core-shell particles to formulate ink jet receptive coatings.

36 Claims, No Drawings

CATIONIC CORE-SHELL PARTICLES WITH STABILIZER-CONTAINING ACID-SWELLABLE SHELLS

This application is a continuation-in-part of our commonly assigned, co-pending U.S. patent application Ser. No. 10/147,655 filed May 16, 2002, entitled "Core Shell Polymeric Compositions".

FIELD OF INVENTION

This invention concerns cationic core-shell particles having an acid-insoluble polymeric core component and an acid-swellable polymeric shell component disposed generally about said core so that upon neutralizing said shell with acid, a portion of said shell remains attached or associated with said core; and wherein said shell contains a stabilizer that is covalently bonded to the polymeric shell component. This invention further concerns polymer latex compositions wherein said polymeric shell component has been neutralized and substantially, but not totally, dissolved so as to form a blend of neutralized core-shell polymer and an aqueous solution of neutralized shell polymer. More particularly, the invention concerns the use of latex compositions produced from these cationic core-shell particles to formulate ink jet receptive coatings.

BACKGROUND OF THE INVENTION

Ink jet printing is widely used to print on a variety of substrates (including paper, textiles, and plastic films). These substrates are often coated with a material that enhances their receptivity for the ink jet ink. In the case of aqueous dye-based inks, which comprise the majority of inks currently used in ink jet printing, two properties are of paramount importance. The first is an affinity for water, as the coating must absorb a large amount of water from the ink in order to obtain a print that is dry to the touch in few seconds. Ink jet ink formulations often contain over 90% water. Furthermore, the coating must maintain its physical integrity while absorbing all of this water. In other words, the receptive coating must be hydrophilic enough to absorb a large quantity of water without actually being water-soluble.

The second important property is dye fixation. The majority of aqueous ink jet inks are based on dyes rather than pigments. To obtain sharp prints with high color density, the dye molecules must be immobilized almost immediately upon contact of the ink with the substrate. Penetration of the dyes into the substrate will result in reduced color density, while lateral migration of the dye molecules will cause indistinctness in the image formed.

In order to obtain high water absorption, ink jet receptive coatings have traditionally been formulated with both hydrophilic pigments (such as silica or alumina) and hydrophilic binders. While the most commonly used hydrophilic binders are polyvinyl alcohol (PVOH) and polyvinylpyrrolidinone (PVP), other suitable natural and synthetic polymers are known in the art (e.g., gelatin, starch, polyethylene oxide (PEO), hydroxyethylcellulose, carboxymethylcellulose, and the like). Those polymers that contain hydroxyl groups (such as starch, PVOH, and PEO) are often cross-linked with a compound such as glyoxal or glutaraldehyde to render them water-insoluble while maintaining their hydrophilicity. Fully hydrolyzed polyvinyl alcohol is particularly useful because it can be dissolved in hot water and remains in solution when cooled to room temperature. When the PVOH is coated on a substrate and then dried, it will not readily redissolve in room-temperature water. However, a problem exists with use of PVOH in that PVOH has no dye trapping properties.

The dyes that are commonly employed in aqueous ink jet inks are anionic, containing sulfonic acid groups. Thus dye fixation is usually accomplished by the employment of cationic polymers, although some highly polar nonionic polymers (such as PVP and polyethyloxazoline) have a limited amount of dye fixing capability. These latter polymers fix dyes by dipolar interactions between their amide groups and the sulfonic acid groups of the dye molecules, while the cationic polymers work by the more efficient mechanism of salt formation.

The most widely used cationic dye fixative in ink jet receptive coatings is poly(diallyldimethylammonium chloride), although other water-soluble cationic polymers are known in the art. For example, U.S. Pat. No. 6,010,790 teaches the use of poly(vinylbenzylquaternary ammonium salts). Other examples of water-soluble cationic polymers are cationic starch, cationic polyvinyl alcohol, guanidine-formaldehyde resins, epichlorohydrin-polyamine condensates, and water-soluble cationic acrylic resins.

However, a problem exists with the use of both soluble dipolar polymers and soluble cationic polymers in that, unless these polymers are cross-linked in some way, their presence has a detrimental effect on the water resistance of the ink jet prints.

As an alternative to water-soluble cationic resins, cationic acrylic or styrenic latices can be used as fixatives for anionic dyes in ink jet receptive coatings. These latices behave like plastic pigments. Attaching the positive charges to the surface of a pigment particle rather than to a soluble resin greatly enhances the water resistance of the ink jet prints. However, using substantial amounts of these cationic plastic pigments in a coating also results in rheological problems, which make the coatings difficult to employ on coating machinery. Furthermore, the level of cationic charge achievable with the cationic plastic pigment may not be high enough to achieve the desired level of dye fixing.

Anionic acrylic colloidal dispersion polymeric resins are widely used in the ink and coatings industries. Such polymers are manufactured by first making an acrylic latex that contains a substantial amount of an acidic monomer (such as methacrylic acid). Usually the amount of acidic monomer is sufficient to give the polymer an acid number of about 60 to about 120. The acidic functionality of the polymer is subsequently neutralized via the employment of a base (such as sodium hydroxide, potassium hydroxide, ammonia, or a water-soluble amine). This greatly enhances the hydrophilicity of the polymer, and the latex particles first swell and then lose their discreteness. While the resulting anionic acrylic colloidal dispersion polymeric resin product appears to be clear and homogeneous on a macroscopic basis, it is actually inhomogeneous on a molecular level, having some domains that are rich in hydrophobic moieties and other domains that are rich in hydrophilic ones. If a fugitive base is employed in the neutralization, these polymer dispersions dry to form water-insoluble films.

The production of anionic polymer latexes having alkali-insoluble cores and colloidal dispersion type shells are taught in U.S. Pat. No. 4,916,171. However, these anionic polymers are unsuitable for use in ink jet coating formulations as cationicity is required for proper dye fixation.

Ink jet images are commonly formed by spraying ink formulations, the majority of which are aqueous dye-based ink solutions, onto ink jet receptive coatings. The dyes are molecularly adsorbed on the surface of the coating, where they are subsequently exposed to ambient atmospheric pollutants and light. Over time, photochemical reactions and chemical reactions with oxygen, ozone, nitrogen oxides, and/or sulfur oxides commonly cause the dyes to fade.

A traditional method of attempting to improve the fade resistance of ink jet prints has been to add stabilizers to ink jet ink formulations. For example, U.S. Pat. No. 5,124,723 describes ink formulations, which contain hydroxyphenylbenzotriazole light absorbers produced as water-soluble sulfonate salts. The use of ink formulations containing water-soluble porphines as light absorbers is described in U.S. Pat. No. 5,891,229.

Another approach in the attempt to improve ink jet fade resistance has been to add stabilizers to ink jet coating formulations. U.S. Pat. No. 4,926,190 describes the addition of substituted hydroxyphenylbenzotriazole derivatives to a coating mixture. The use of water-soluble ultraviolet absorbers in a coating formulation is described in U.S. Pat. No. 5,096,781.

The use of water-soluble light stabilizers in ink jet receptive coatings has proven to be somewhat inefficient in that the stabilizers tend to migrate into the fibers of coated fiber-containing substrates. This same migration problem is faced by ink formulations that contain stabilizers as formulation additives; and once the ink is separated from its aqueous polymeric vehicle, the dye is open to interaction with ambient conditions. However, if the stabilizers were not water-soluble, their oleophilic nature would not allow appreciable concentrations of the stabilizers in aqueous based coating systems when employed as formulation additives.

Another problem often experienced with the use of light stabilizers as formulation additives is the tendency of the stabilizers to be extruded out of the substrate (a condition known as "blooming"). Such blooming can cause a lost in effectiveness as well as dust formation problems.

Therefore, an object of the present invention is to avoid the major rheological problems associated with traditional binders employed in ink jet coatings by disclosing a cationic core-shell polymer latexes having an acid-insoluble polymeric core and an acid-swellable polymeric shell component which contains a stabilizer that is covalently bonded to the polymeric shell component.

Another object of this invention is to disclose cationic core-shell particles.

A further object of this invention is to disclose core-shell particle latexes suitable for use in formulating ink jet receptive coatings.

Another object of this invention is to disclose efficient, economical ink jet receptive coatings that are resistant to blooming.

SUMMARY OF THE INVENTION

The objects of this invention are met via the production of cationic core-shell particles having an acid-insoluble polymeric core component and an acid-swellable polymeric shell component wherein the shell contains a stabilizer that is covalently bonded to the polymeric shell component. The polymeric shell component is disposed generally about the polymeric core component in such a manner so that, upon neutralizing the said shell with acid, the shell polymer remains attached or associated with the particle core and becomes a colloidal dispersion. As used herein the term "stabilizer" means a compound which contains in its molecular chain sites possessing ultraviolet absorbing activity, free radical scavenging activity, antioxidant activity, and/or peroxide decomposing activity.

Due to the core-shell morphology of the particle, only the shell component contains stabilizer (which is covalently bound to the shell polymer). This is an improvement over prior technologies in that the present invention permits placement of the stabilizer where the dye is actually adsorbed into the ink jet receptive coating. Moreover, the core-shell morphology allows one to use smaller quantities of the stabilizer while effecting a greater surface concentration.

The covalent bonding of the stabilizer to the shell component avoids the migration problems often associated with the use of water-soluble light stabilizers as formulation additives to inks or ink jet receptive coatings. Additionally, the binding of the stabilizer into the polymer backbone of the shell component prevents blooming.

Ink jet receptive coatings formulated with latex compositions produced from these cationic core-shell particles produce prints having enhanced definition and superior color density. These coatings also exhibit excellent rheological properties, which make them suitable for use with high-speed paper coating equipment.

DESCRIPTION OF THE PREFERRED EMBODIMENT

The cationic core-shell particles suitable for use in formulating ink jet receptive coatings comprise:

(A) a polymeric core component, said core component comprising the free radical polymerization reaction product of a mixture comprising:
  (1) about 80.0% to about 99.5% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof; and
  (2) about 0.5% to about 20.0% by total weight of the mixture of a member selected from the group consisting of ethylenically unsaturated monomers containing at least one quaternary ammonium group and combinations thereof;
  (3) about 0.5% to about 8.0% by total weight of the mixture of a surfactant about selected from the group consisting of nonionic surfactants, cationic surfactants, and combinations thereof; and
  (4) a catalytic amount of polymerization initiator; and (B) an acid-swellable polymeric shell component disposed generally about said core component, said shell component comprising the free radical polymerization reaction product of a mixture comprising:
  (1) about 5.0% to about 35.0% by total weight of the mixture of a member selected from the group consisting of amine-containing ethylenically unsaturated monomers and combinations thereof;
  (2) about 10.0% to about 80.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamide, N-alkyl-substituted acrylamides, methacrylamide, N-alkyl-substituted methacrylamides, and combinations thereof;

(3) about 0.5% to about 30.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof;

(4) up to about 15.0% by total weight of the mixture of a member selected from the group consisting of ethylenically unsaturated monomers containing at least one quaternary ammonium group and combinations thereof;

(5) up to about 8.0% by total weight of the mixture of a member selected from the group consisting of ethylenically unsaturated monomers containing at least one hydroxyl group and combinations thereof;

(6) up to about 8.0% by total weight of the mixture of a member selected from the group consisting of N-hydroxymethylacrylamide, N-hydroxymethylmethacrylamide, N-alkoxymethylacrylamide, N-alkoxymethylmethacrylamide, and combinations thereof;

(7) up to about 4.0% by total weight of the mixture of a chain transfer agent;

(8) about 0.5% to about 8.0% by total weight of the mixture of a surfactant about selected from the group consisting of nonionic surfactants, cationic surfactants, and combinations thereof; and (9) a catalytic amount of polymerization initiator; and wherein said stabilizer is covalently bound to said shell component.

Preferred cationic core-shell particles comprise:

(A) a polymeric core component, said core component comprising the free radical polymerization reaction product of a mixture comprising:

(1) about 85.0% to about 98.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof; and (2) about 2.0% to about 15.0% by total weight of the mixture of a member selected from the group consisting of ethylenically unsaturated monomers containing at least one quaternary ammonium group and combinations thereof;

(3) about 1.0% to about 6.0% by total weight of the mixture of a surfactant about selected from the group consisting of nonionic surfactants, cationic surfactants, and combinations thereof; and (4) a catalytic amount of polymerization initiator; and (B) an acid-swellable polymeric shell component disposed generally about said core component, said shell component comprising the free radical polymerization reaction product of a mixture comprising:

(1) about 10.0% to about 30.0% by total weight of the mixture of a member selected from the group consisting of amine-containing ethylenically unsaturated monomers and combinations thereof;

(2) about 15.0% to about 80.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamide, N-alkyl-substituted acrylamides, methacrylamide, N-alkyl-substituted methacrylamides, and combinations thereof;

(3) about 5.0% to about 20.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof;

(4) up to about 10.0% by total weight of the mixture of a member selected from the group consisting of ethylenically unsaturated monomers containing at least one quaternary ammonium group and combinations thereof;

(5) up to about 5.0% by total weight of the mixture of a member selected from the group consisting of ethylenically unsaturated monomers containing at least onehydroxyl group and combinations thereof;

(6) up to about 5.0% by total weight of the mixture of a member selected from the group consisting of N-hydroxymethylacrylamide, N-hydroxymethylmethacrylamide, N-alkoxymethylacrylamide, N-alkoxymethylmethacrylamide, and combinations thereof;

(7) up to about 3.0% by total weight of the mixture of a chain transfer agent;

(8) about 1.0% to about 6.0% by total weight of the mixture of a surfactant about selected from the group consisting of nonionic surfactants, cationic surfactants, and combinations thereof; and (9) a catalytic amount of polymerization initiator; and wherein said stabilizer is covalently bound to said shell component.

The polymeric core component comprises from about 60% to about 95% of the total weight of the core-shell particle. It is preferred that the core component constitute from about 70% to about 90% of the total weight of the particle.

The polymeric core component comprises the free radical polymerization reaction product of a mixture comprising:

(1) about 80.0% to about 99.5% (preferably from about 85.0% to about 98.0%) by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) about 0.5% to about 20.0% (preferably from about 2.0% to about 15.0%) by total weight of the mixture of a member selected from the group consisting of ethylenically unsaturated monomers containing at least one quaternary ammonium group and combinations thereof; and (3) a catalytic amount of polymerization initiator.

It is preferred that the ethylenically unsaturated monomer containing at least one quaternary ammonium group employed in the production of the polymeric core component be a salt selected from the group consisting of vinylbenzyltrimethylammonium salts, acryloyloxyethyltrimethylammonium salts, acryloyloxyethyldiethylmethylammonium salts, methacryloyloxyethyltrimethylammonium salts, methacryloyloxyethylbenzyldimethylammonium salts, acryloyloxyethylbenzyldimethylammonium salts, 2-hydroxy-3-methacryloyloxypropyltrimethylammonium salts, 2-hydroxy-3-acryloyloxypropyltrimethylammonium salts, methacrylamidopropyltrimethylammonium salts, and combinations thereof; wherein said salt contains at least one counter anion selected from the group consisting of halides, sulfates, alkylsulfates, arylsulfates, and combinations thereof. It is further preferred that the counter anion be a member selected from the group consisting of chloride, bromide, methosulfate, sulfate, and combinations thereof.

The polymeric shell component comprises from about 15% to about 40% of the total weight of the core-shell particle. It is preferred that the shell component constitute from about 10% to about 30% of the total weight of the particle.

The polymeric shell component comprises the free radical polymerization reaction product of a mixture comprising:

(1) about 5.0% to about 35.0% (preferably from about 10.0% to about 30.0%) by total weight of the mixture of a member selected from the group consisting of amine-containing ethylenically unsaturated monomers and combinations thereof;

(2) about 10.0% to about 80.0% (preferably from about 15.0% to about 80.0%) by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamide, N-alkyl-substituted acrylamides, methacrylamide, N-alkyl-substituted methacrylamides, and combinations thereof, (3) about 0.5% to about 30.0% (preferably from about 5.0% to about 20.0%) by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof;

(4) up to about 15.0% (preferably up to about 10.0%) by total weight of the mixture of a member selected from the group consisting of ethylenically unsaturated monomers containing at least one quaternary ammonium group and combinations thereof;

(5) up to about 8.0% (preferably up to about 5.0%) by total weight of the mixture of a member selected from the group consisting of ethylenically unsaturated monomers containing at least one hydroxyl group and combinations thereof;

(6) up to about 8.0% (preferably up to about 5.0%) by total weight of the mixture of a member selected from the group consisting of N-hydroxymethylacrylamide, N-hydroxymethylmethacrylamide, N-alkoxymethylacrylamide, N-alkoxymethylmethacrylamide, and combinations thereof;

(7) up to about 4.0% (preferably up to about 3.0%) by total weight of the mixture of a chain transfer agent;

(8) about 0.5% to about 8.0% (preferably from about 1.0% to about 6.0%) by total weight of the mixture of a surfactant about selected from the group consisting of nonionic surfactants, cationic surfactants, and combinations thereof; and (9) a catalytic amount of polymerization initiator.

The cationic core-shell particles of the present invention differ from traditional core-shell polymers in that the shell component contains basic groups and is acid-swellable (i.e., can be neutralized with acid). These basic groups are provided by the use of amine-functional monomers in the production of the acid-swellable polymeric shell component of the core-shell particle. Amine-containing ethylenically unsaturated monomers which are suitable for use in the present invention include those compounds containing both polymerizable ethylenic unsaturation and at least one amine group, which may be primary, secondary, or tertiary. Preferred amine-containing ethylenically unsaturated monomers include dimethylaminoethyl acrylate, dimethylaminoethyl methacrylate, diethylaminoethyl methacrylate, t-butylaminoethyl methacrylate, dimethylaminopropyl methacrylamide, allylamine, 2-vinylpyridine, 4-vinylpyridine, and the like. The amine-containing ethylenically unsaturated monomer comprises from about 5.0% to about 35.0%, preferably from about 10.0% to about 30.0%, by total weight of the mixture employed in the free radical polymerization reaction used to produce the polymeric shell component of the core-shell particle.

The incorporation of a stabilizer in the free radical polymerization reaction employed to produce the polymeric shell component of the core-shell particle results in the stabilizer being covalently bonded to the polymeric shell component. Any ultraviolet absorber, radical scavenger, antioxidant, or peroxide decomposer which contains at least one ethylenically unsaturated group (thereby being capable of covalent bonding to the polymeric shell component via free radical polymerization reaction) is suitable for use in the present invention. Commonly known methods: of producing such compounds containing at least one ethylenically unsaturated group include acryloyation and reacting the compound to be modified with a reactant that contains at least one acryloyl group (e.g., glycidyl (meth)acrylate or isocyanatoethyl (meth)acrylate). Where an ultraviolet absorber is employed as a stabilizer it is preferred that the absorber be a member selected from the group consisting of hydroxyphenylbenzotrazoles containing at least one ethylenically unsaturated group, hydroxyphenylbenzophenones containing at least one ethylenically unsaturated group, porphines which have been modified to contain at least one ethylenically unsaturated group, and combinations thereof. Where a radical scavenger is employed as a stabilizer it is preferred that the scavenger be a member selected from the group consisting of tetramethylpiperadine derivatives containing at least one ethylenically unsaturated group and combinations thereof. Where an antioxidant is employed as a stabilizer it is preferred that the antioxidant be a member selected from the group consisting of stericallyhindered phenols containing at least one ethylenically unsaturated group, diarylamines containing at least one ethylenically unsaturated group, and combinations thereof. Where a peroxide decomposer is employed as a stabilizer it is preferred that the decomposer be a member selected from the group consisting of triphenyl phosphites which have been modified to contain at least one ethylenically unsaturated group, mercaptans which have been modified to contain at least one ethylenically unsaturated group, and combinations thereof. Suitable modified triphenyl phosphites and modified mecaptans (such as modified thiodipropionic acids, thiobenzimidazoles, bisaryldisuophides, and the like) may be produced by any method which results in the modified compound containing at least one ethylenically unsaturated group. For example, triphenyl phosphite can be prepared with a combination of styryl phenol and 2,4-di-tertiary butyl phenol. Likewise, thiodipropionic acid can be reacted with glycidyl methacrylate to produce the modified compound.

The dyes that are commonly employed in aqueous ink jet inks are anionic, containing sulfonic acid groups. The cationic nature of the core-shell particle serves to fix such anionic dyes. Where desired, the core-shell particle's cationic nature may be increased by incorporating ethylenically unsaturated monomer containing at least one quaternary ammonium group in the production of the polymeric shell component at a level up to about 15.0% (preferably up to about 10.0%) by total weight of the mixture employed in the free radical polymerization reaction. Where employed, it is preferred that said ethylenically unsaturated monomer be a salt selected from the group consisting of vinylbenzyltrimethylammonium salts, acryloyloxyethyltrimethylammonium salts, acryloyloxyethyldiethylmethylammonium salts, methacryloyloxyethyltrimethylammonium salts, methacryloyloxyethylbenzyldimethylammonium salts, acryloyloxyethylbenzyldimethylammonium salts, 2-hydroxy-3-methacryloyloxypropyltrimethylammonium salts, 2-hydroxy-3-acryloyloxypropyltrimethylammonium salts, methacrylamidopropyltrimethylammonium salts, and combinations thereof; wherein said salt contains at least one counter anion selected from the group consisting of halides, sulfates, alkylsulfates, arylsulfates, and combinations thereof. It is further preferred that the counter anion be a member selected from the group consisting of chloride, bromide, methosulfate, sulfate, and combinations thereof.

Where desired, the core-shell particle may be given hydroxyl functionality via the inclusion in the free radical polymerization reaction employed to produce the polymeric shell component of up to about 8.0% (preferably up to about 5.0%) by total weight of the mixture of hydroxyl-containing monomer. Hydroxyl-containing monomers which are suitable for use in the present invention include those monomers containing polymerizable ethyleneic unsaturation and at least one hydroxyl group. Preferred hydroxyl-containing monomers include hydroxyethyl acrylate, hydroxypropyl acrylate, hydroxybutyl acrylate, hydroxyethyl methacrylate, hydroxypropyl methacrylate, butanediol monovinyl ether, allyl alcohol, and the like. The presence of hydroxyl groups in the core-shell particle facilitates the linking with crosslinking agents that are conventionally used in ink jet receptive coatings (such as aminoplast resins, glyoxal, glutaraldehyde, and the like).

Where desired, the core-shell particles may also be made self cross-linkable via the inclusion in the free radical polymerization reaction employed to produce the polymeric shell component of up to about 8.0% (preferably up to about 5.0%) by total weight of the mixture of a member selected from the group consisting of N-hydroxymethylacrylamide, N-hydroxymethylmethacrylamide, N-alkoxymethylacrylamide, N-alkoxymethylmethacrylamide, and combinations thereof.

Where desired, up to about 4.0% (preferably up to about 3.0%) by total weight of the mixture of a chain transfer agent may be employed in the shell component polymerization reaction in order to lower the molecular weight of the polymer. Preferred chain transfer agents include dodecyl mercaptan, 2-mercaptoethanol, alkyl mercaptopropionates, mercaptoacetic acid, mercaptopropionic acid, octyl mercaptan, and the like.

Surfactants suitable for use in the free radical polymerization reactions include members selected from the group consisting of nonionic surfactants, cationic surfactants, and combinations thereof. Preferred nonionic surfactants include ethoxylated alkylphenols, ethoxylated fatty alcohols, ethylene oxide/propylene oxide block copolymers, and the like. Preferred cationic surfactants include, but are not limited to, the following: alkyltrimethylammonium salts wherein the alkyl group contains from 8 to 22 (preferably 12 to 18) carbon atoms and the counterion of the salt is a member selected from the group consisting of chloride, bromide, methylsulfate, and ethylsulfate; alkylbenzyldimethylamrnmonium salts wherein the alkyl group contains from 8 to 22 (preferably 12 to 18) carbon atoms and the counterion of the salt is a member selected from the group consisting of chloride, bromide, methylsulfate, and ethylsulfate; and alkylpyridinium salts wherein the alkyl group contains from 8 to 22 (preferably 12 to 18) carbon atoms and the counterion of the salt is a member selected from the group consisting of chloride, bromide, methylsulfate, and ethylsulfate. The surfactant comprises from about 0.5% to about 8.0%, preferably from about 1.0% to about 6.0%, by total weight of the mixtures employed in the free radical polymerization reactions.

A catalytic amount of polymerization initiator is used in the free radical polymerization reactions. The amount of initiator employed commonly comprises from about 0.1% to about 3.0% (preferably from about 0.2% to about 2.0%) by weight of the total mixture used to produce the respective polymeric component. Traditional emulsion polymerization initiators (such as thermal initiators, redox initiators, and the like) are suitable for use in the emulsion polymerization reaction. Examples of suitable thermal initiators include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof. Examples of suitable redox initiators include, but are not limited to, the following: cumene hydroperoxide-sodium metabisulfite, cumene hydroperoxide-iron (II) sulfate, and combinations thereof. Preferred initiators include water-soluble azo compounds (such as V-50 or VA-086 available from Wako Chemicals).

Where desired, the core-shell particle may comprise a plurality of shell components, each disposed about the core component.

While any free radical polymerization reaction is suitable for use in the present invention, it is preferred to employ either an emulsion polymerization reaction or a suspension polymerization reaction. The use of an emulsion polymerization reaction is more preferred.

Latexes suitable for use as ink jet receptive coatings in the present invention include aqueous suspensions of cationic core-shell particles. It is preferred that such latexes have a solids content in the range of about 25.0% to about 50.0%, with the more preferred range being about 35.0% to about 45.0%.

Preferred latexes suitable for use as ink jet receptive coatings in the present invention also include aqueous suspensions of cationic core-shell particles wherein the pH of the latex is adjusted. to a level in the range of about 3.5 to about 7.0 (preferably from 4.0 to about 6.0) in order to swell or substantially, but not totally, dissolve the polymeric shell component so as to form core particles with attached colloidal dispersion polymer. Neutralization of the core-shell particles to form the pH-adjusted aqueous-dispersed latexes can be accomplished via the addition of an acid selected from the group consisting of mineral acids, water-soluble carboxylic acids, water-soluble sulfonic acids, and combinations thereof.

It is preferred to use low molecular weight carboxylic acids such as acetic acid, propionic acid, glycolic acid, lactic acid, and combinations thereof for the neutralization, as these acids will evaporate readily upon drying of the coating containing the polymer (thereby rendering the coating water-insoluble). Furthermore, these acids are less corrosive to coating equipment than are the stronger sulfonic and mineral acids.

As the acid-neutralization causes the polymeric shell component to swell and become more soluble, a substantial increase in viscosity occurs. It is preferred that these pH-adjusted aqueous-dispersed latexes have a solids content in the range of about 25.0% to about 50.0%, with the more preferred range being about 35.0% to about 45.0%.

The cationic latexes of the present invention are excellent ink jet receptive coatings which impart superior fade resistances. Such ink jet receptive coatings can be employed to produce ink jet printable products via the process of coating a chosen substrate on at least one side with the ink jet receptive coating. Substrates which are suitable for use in producing such ink jet printable products include paper, paperboard, wood, plastic film, metal foil, textiles, and the like. Where desired, any of the pigments traditionally used in ink jet receptive coatings can be employed in the coating provided that the pigments are compatible with a cationic binder. Such pigments include, but are not limited to, the following: silica, alumina, plastic pigments, calcium carbonate, kaolin clay, and combinations thereof.

Where desired, cationic and nonionic binders can be incorporated in the ink jet receptive coatings. These binders include, but are not limited to, the following: polyvinyl alcohol, cationic polyvinyl alcohol, polyvinylpyrrolidone, cationic vinylpyrrolidone copolymers, polyethyloxazoline, cationic water-soluble acrylic polymers, nonionic water-soluble acrylic polymers, starch, cationic starch, polyethylene glycol, methylcellulose, hydroxyethylcellulose, and mixtures thereof.

In cases where the ink jet receptive coatings contain hydroxyl functionality, cross-linkers that are traditionally used with hydroxyl-functional resins can be added to the coating. Such cross-linkers include urea-formaldehyde resins, melamine-formaldehyde resins, glyoxal, glutaraldehyde, titanates, zirconium salts, and the like.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A core-shell particle latex having an acid-insoluble, emulsion polymer core and an acid-swellable, emulsion polymer shell containing bound ultraviolet absorber was prepared as follows. To a 2 liter round bottom flask fitted with a stirrer, a reflux condenser, two addition funnels, a heating mantle, and a temperature controller was charged 330 grams of deioinzed water, 30.0 g of ARQUAD C-50 (a cationic surfactant available from Akzo Nobel), 30.0 g of styrene, 1.6 g of a 75% aqueous solution of methacryloyloxyethyltrimethylammonium chloride (METAC), and a solution of 6.0 g of V-50 (a cationic initiator available from Wako Chemicals) in 15.0 g of water. The charge was heated to 60° C. and 169.5 g of styrene and 9.9 g of METAC were added concurrently over three hours. Then the batch was heated to 70° C. and held there for one hour to complete the formation of the core latex. The batch was then cooled to 60° C., and a solution of 1.8 g of V-50 in 32.0 g of water was added. Then a premixed shell monomer feed was added over one hour. The shell monomer feed had been made by charging a flask with 54.0 g of styrene, 4.5 g of meta-TMI (an isocyanate-functional styrenic monomer available from Cytec Industries), 1.5 g of TINUVIN 1130 (a hydroxyl-functional ultraviolet absorber available from Ciba Speciality Chemicals), and one drop of dibutyltin dilaurate. This mixture had been allowed to react at room temperature overnight to form a solution of a polymerizable ultraviolet absorber in styrene. To this solution was then added 27.0 g of dimethylaminoethyl methacrylate, 10.0 g of ARQUAD C-50, and 70.0 g of water to form a pre-emulsified monomer feed. Nine g of METAC were added concurrently to the batch with this emulsified feed. When the monomer additions were completed, the temperature was increased to 70°, and 0.45 g of t-butyl hydroperoxide and a solution of 0.88 g of isoascorbic acid in 10.0 g of water were added. The batch was then heated to 85° C. and held there for two hours to complete the polymerization. The resultant cationic core-shell particle latex had a solids content of 41.4%, a pH of 7.6, a viscosity of 60 cP, and an average particle size of 47 nm.

EXAMPLE 2

A core-shell polymer composition having an acid-insoluble, emulsion polymer core and an acid-swellable, emulsion polymer shell containing bound ultraviolet absorber can be prepared as follows. A 2-liter round-bottom flask equipped with a thermometer, stirrer, and heating mantle is charged with 393.6 g of deionized water, 30.0 g of ARQUAD C-50 surfactant (a 50% solution of dodecyltrimethylammonium chloride in isopropyl alcohol available from Akzo Nobel), 29.9 g of styrene, 1.6 g of methacryloyloxyethyltrimethylammonium chloride (METAC), and a solution of 6.0 g of V-50 (an azo free radical initiator available from Wako Chemicals) in 15.0 g of deionized water. The mixture is heated to 60° C., and 169.9 g of styrene and 8.9 g of METAC are added concurrently over a three-hour period. When the monomer feed is completed, the temperature of the reaction is increased to 70° C. and stirring is continued for one hour. The core polymer component is subsequently cooled to 60° C., a solution of 1.8 g of V-50 in 32.0 g of deionized water is added, and a solution comprising 10.8 g of TINUVIN 796 (an ethylenically unsaturated hydroxyphenylbenzoltriazole ultraviolet absorber available from Ciba Speciality Chemicals) dissolved in 42.0 of styrene and 27.0 g of dimethylaminoethyl methacrylate is added over a one-hour period. A separate charge of 10.0 g of METAC is concurrently added over the one-hour period to the core polymer component.

When the feeds are completed, the temperature of the reaction is increased to 70° C. and stirring is continued for one hour. After this period the temperature is raised to 85°

C., 0.45 g of t-butyl hydroperoxide and a solution of 0.88 g of isoascorbic acid in 10.0 g of deionized water is added, and stirring was continued for a two-hour period to scavenge any residual monomer.

EXAMPLE 3

An ink jet receptive coating can be prepared by mixing together 60 parts on a dry basis of the cationic core-shell polymer composition of Example 2, 40 parts on a dry basis of CAB-O-SPERSE PG003 (a 40% aqueous dispersion of fumed alumina available from Cabot Corp.), and 10 parts on a dry basis of a colloidal dispersion made by adjusting the pH of the core-shell polymer composition of Example 2 to 3.5 with lactic acid.

EXAMPLE 4

An ink jet receptive coating can be prepared by mixing together 60 parts on a dry basis of the cationic core-shell polymer composition of Example 2, 40 parts on a dry basis of CAB-O-SPERSE PG003 (a 40% aqueous dispersion of fumed alumina available from Cabot Corp.), and 10 parts on a dry basis of TRUDOT P2605 (a binder available from MeadWestvaco Corp.).

EXAMPLE 5

A core-shell polymer composition having an acid-insoluble, emulsion polymer core and an acid- swellable, emulsion polymer shell containing bound ultraviolet absorber can be prepared as follows. A 2-liter round-bottom flask equipped with a thermometer, stirrer, and heating mantle is charged with 394.0 g of deionized water, 30.0 g of ARQUAD C-50 surfactant (a 50% solution of dodecyltrimethylammonium chloride in isopropyl alcohol available from Akzo Nobel), 30.0 g of styrene, 1.5 g of methacryloyloxyethyltrimethylammonium chloride (METAC), and a solution of 6.0 g of V-50 (an azo free radical initiator available from Wako Chemicals) in 15.0 g of deionized water. The mixture is heated to 60° C., and 170.0 g of styrene and 8.5 g of METAC are added concurrently over a three-hour period. When the monomer feed is completed, the temperature of the reaction is increased to 70° C. and stirring is continued for one hour. The core polymer is subsequently cooled to 60° C., a solution of 1.8 g of V-50 in 32.0 g of deionized water is added, and a solution comprising 6.3 g of TINUVIN 796 (an ethylenically unsaturated hydroxyphenylbenzoltriazole ultraviolet absorber available from Ciba Speciality Chemicals) dissolved in 47.0 of styrene and 28.0 g of dimethylaminoethyl methacrylate is added over a one-hour period. A separate charge of 10.0 g of METAC is concurrently added over the one-hour period to the core polymer component.

When the feed is completed, the temperature of the reaction is increased to 70° C. and stirring is continued for one hour. After this period the temperature is raised to 85° C., 0.45 g of t-butyl hydroperoxide and a solution of 0.88 g of isoascorbic acid in 10.0 g of deionized water is added, and stirring is continued for a two-hour period to scavenge any residual monomer.

EXAMPLE 6

An ink jet receptive coating can be prepared by mixing together 60 parts on a dry basis of the cationic core-shell polymer composition of Example 5, 40 parts on a dry basis of CAB-O-SPERSE PG003 (a 40% aqueous dispersion of fumed alumina available from Cabot Corp.), and 10 parts on a dry basis of a colloidal dispersion made by adjusting the pH of the core-shell polymer composition of Example 5 to 3.5 with lactic acid.

EXAMPLE 7

A core-shell polymer composition having an acid-insoluble, emulsion polymer core and an acid-swellable, emulsion polymer shell containing bound ultraviolet absorber can be prepared as follows. A 2-liter round-bottom flask equipped with a thermometer, stirrer, and heating mantle is charged with 393.0 g of deionized water, 29.0 g of ARQUAD C-50 surfactant (a 50% solution of dodecyltrimethylammonium chloride in isopropyl alcohol available from Akzo Nobel), 31.0 g of styrene, 1.5 g of methacryloyloxyethyltrimethylammonium chloride (METAC), and a solution of 6.0 g of V-50 (an azo free radical initiator available from Wako Chemicals) in 15.0 g of deionized water. The mixture is heated to 60° C., and 169.9 g of styrene and 8.9 g of METAC are added concurrently over a three-hour period. When the monomer feed is completed, the temperature of the reaction is increased to 70° C. and stirring is continued for one hour. The core polymer is subsequently cooled to 60° C., a solution of 1.8 g of V-50 in 32.0 g of deionized water is added, and a solution comprising 10.8 g of TINUVIN 796 (an ethylenically unsaturated hydroxyphenylbenzoltriazole ultraviolet absorber available from Ciba Speciality Chemicals) dissolved in 34.0 of styrene and 27.0 g of dimethylaminoethyl methacrylate is added over a one-hour period. A separate solution of 9.0 g of METAC and 9.0 g of hydroxyethyl methacrylate is concurrently added over the one-hour period to the core polymer component.

When the feed is completed, the temperature of the reaction is increased to 70° C. and stirring was continued for one hour. After this period the temperature is raised to 85° C., 0.45 g of t-butyl hydroperoxide and a solution of 0.88 g of isoascorbic acid in 10.0 g of deionized water is added, and stirring is continued for a two-hour period to scavenge any residual monomer.

EXAMPLE 8

An ink jet receptive coating can be prepared by mixing together 60 parts on a dry basis of the cationic core-shell polymer composition of Example 7, 40 parts on a dry basis of CAB-O-SPERSE PG003 (a 40% aqueous dispersion of fumed alumina available from Cabot Corp.), and 10 parts on a dry basis of a colloidal dispersion made by adjusting the pH of the core-shell polymer composition of Example 7 to 3.5 with lactic acid.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A cationic core-shell particle suitable for use in formulating ink jet receptive coatings comprising:
   (A) a polymeric core component, said core component comprising the free radical polymerization reaction product of a mixture comprising:
      (1) about 80.0% to about 99.5% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;
(2) about 0.5% to about 20.0% by total weight of the mixture of a member selected from the group consisting of ethylenically unsaturated monomers containing at least one quaternary ammonium group and combinations thereof;
(3) about 0.5% to about 8.0% by total weight of the mixture of a surfactant about selected from the group consisting of nonionic surfactants, cationic surfactants, and combinations thereof; and
(4) a catalytic amount of polymerization initiator; and
(B) an acid-swellable polymeric shell component disposed generally about said core component, said shell component comprising the free radical polymerization reaction product of a mixture comprising:
(1) about 5.0% to about 35.0% by total weight of the mixture of a member selected from the group consisting of amine-containing ethylenically unsaturated monomers and combinations thereof;
(2) about 10.0% to about 80.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamide, N-alkyl-substituted acrylamides, methacrylamide, N-alkyl-substituted methacrylamides, and combinations thereof;
(3) about 0.5% to about 30.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof;
(4) up to about 15.0% by total weight of the mixture of a member selected from the group consisting of ethylenically unsaturated monomers containing at least one quaternary ammonium group and combinations thereof;
(5) up to about 8.0% by total weight of the mixture of a member selected from the group consisting of ethylenically unsaturated monomers containing at least one hydroxyl group and combinations thereof;
(6) up to about 8.0% by total weight of the mixture of a member selected from the group consisting of N-hydroxymethylacrylamide, N-hydroxymethylmethacrylamide, N-alkoxymethylacrylamide, N-alkoxymethylmethacrylamide, and combinations thereof;
(7) up to about 4.0% by total weight of the mixture of a chain transfer agent;
(8) about 0.5% to about 8.0% by total weight of the mixture of a surfactant about selected from the group consisting of nonionic surfactants, cationic surfactants, and combinations thereof; and
(9) a catalytic amount of polymerization initiator; and wherein said stabilizer is covalently bound to said shell component.

2. The cationic core-shell particle of claim 1 which comprises:

(A) a polymeric core component, said core component comprising the free radical polymerization reaction product of a mixture comprising:
(1) about 85.0% to about 98.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof; and
(2) about 2.0% to about 15.0% by total weight of the mixture of a member selected from the group consisting of ethylenically unsaturated monomers containing at least one quaternary ammonium group and combinations thereof;
(3) about 1.0% to about 6.0% by total weight of the mixture of a surfactant about selected from the group consisting of nonionic surfactants, cationic surfactants, and combinations thereof; and
(4) a catalytic amount of polymerization initiator; and
(B) an acid-swellable polymeric shell component disposed generally about said core component, said shell component comprising the free radical polymerization reaction product of a mixture comprising:
(1) about 10.0% to about 30.0% by total weight of the mixture of a member selected from the group consisting of amine-containing ethylenically unsaturated monomers and combinations thereof;
(2) about 15.0% to about 80.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamide, N-alkyl-substituted acrylamides, methacrylamide, N-alkyl-substituted methacrylamides, and combinations thereof;
(3) about 5.0% to about 20.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof;
(4) up to about 10.0% by total weight of the mixture of a member selected from the group consisting of ethylenically unsaturated monomers containing at least one quaternary ammonium group and combinations thereof;
(5) up to about 5.0% by total weight of the mixture of a member selected from the group consisting of ethylenically unsaturated monomers containing at least one hydroxyl group and combinations thereof;
(6) up to about 5.0% by total weight of the mixture of a member selected from the group consisting of N-hydroxymethylacrylamide, N-hydroxymethylmethacrylamide, N-alkoxymethylacrylamide, N-alkoxymethylmethacrylamide, and combinations thereof;
(7) up to about 3.0% by total weight of the mixture of a chain transfer agent;

(8) about 1.0% to about 6.0% by total weight of the mixture of a surfactant about selected from the group consisting of nonionic surfactants, cationic surfactants, and combinations thereof; and (9) a catalytic amount of polymerization initiator; and wherein said stabilizer is covalently bound to said shell component.

3. The core-shell particle of claim 1 wherein said core component constitutes from about 60% to about 95% of the total weight of said particle.

4. The core-shell particle of claim 3 wherein said core component constitutes from about 70% to about 90% of the total weight of said particle.

5. The core-shell particle of claim 1 wherein said shell component constitutes from about 5% to about 40% of the total weight of said particle.

6. The core-shell particle of claim 5 wherein said shell component constitutes from about 10% to about 30% of the total weight of said particle.

7. The core-shell particle of claim 1 wherein the ultraviolet absorber is a member selected from the group consisting of hydroxyphenylbenzotrazoles containing at least one ethylenically unsaturated group, benzophenones containing at least one ethylenically unsaturated group, modified porphines which contain at least one ethylenically unsaturated group, and combinations thereof.

8. The core-shell particle of claim 1 wherein the radical scavenger is a member selected from the group consisting of tetramethylpiperadine derivatives containing at least one ethylenically unsaturated group and combinations thereof.

9. The core-shell particle of claim 1 wherein the antioxidant is a member selected from the group consisting of sterically-hindered phenols containing at least one ethylenically unsaturated group, diarylamines containing at least one ethylenically unsaturated group, and combinations thereof.

10. The core-shell particle of claim 1 wherein the peroxide decomposer is a member selected from the group consisting of modified triphenyl phosphites which contain at least one ethylenically unsaturated group, modified mercaptans which contain at least one ethylenically unsaturated group, and combinations thereof.

11. The core-shell particle of claim 1 wherein the ethylenically unsaturated monomer containing at least one quaternary ammonium group is a salt selected from the group consisting of vinylbenzyltrimethylammonium salts, acryloyloxyethyltrimethylammonium salts, acryloyloxyethyldiethylmethylammonium salts, methacryloyloxyethyltrimethylammonium salts, methacryloyloxyethylbenzyldimethylammonium salts, acryloyloxyethylbenzyldimethylammonium salts, 2-hydroxy-3-methacryloyloxypropyltrimethylammonium salts, 2-hydroxy-3-acryloyloxypropyltrimethylammonium salts, methacrylamidopropyltrimethylannmonium salts, and combinations thereof, and wherein said salt contains at least one counter anion selected from the group consisting of halides, sulfates, alkylsulfates, arylsulfates, and combinations thereof.

12. The core-shell particle of claim 11 wherein the counter anion is a member selected from the group consisting of chloride, bromide, methosulfate, sulfate, and combinations thereof.

13. The core-shell particle of claim 1 wherein the polymerization initiator comprises from about 0.1% to about 3.0% by total weight of the mixture employed to produce said shell component and is a member selected from the group consisting of thermal initiators, redox initiators, and combinations thereof.

14. The core-shell particle of claim 1 wherein the amine-containing ethylenically unsaturated monomer is a member selected from the group consisting of dimethylaminoethyl acrylate, dimethylaminoethyl methacrylate, diethylaminoethyl methacrylate, t-butylaminoethyl methacrylate, dimethylaminopropyl methacrylamide, allylamine, 2-vinylpyridine, 4-vinylpyridine, and combinations thereof.

15. The core-shell particle of claim 1 wherein the ethylenically unsaturated monomer containing at least one hydroxyl group is a member selected from the group consisting of hydroxyethyl acrylate, hydroxypropyl acrylate, hydroxybutyl acrylate, hydroxyethyl methacrylate, hydroxypropyl methacrylate, butanediol monovinyl ether, allyl alcohol, and combinations thereof.

16. The core-shell particle of claim 1 wherein the chain transfer agent is a member selected from the group consisting of dodecyl mercaptan, 2-mercaptoethanol, alkyl mercaptopropionates, mercaptoacetic acid, mercaptopropionic acid, octyl mercaptan, and combinations thereof.

17. The core-shell particle of claim 1 wherein the nonionic surfactant is a member selected from the group consisting of ethoxylated alkylphenols, ethoxylated fatty alcohols, ethylene oxide/propylene oxide block copolymers, and combinations thereof.

18. The core-shell particle of claim 1 wherein the cationic surfactant is a member selected from the group consisting of alkyltrimethylammonium salts wherein the alkyl group contains from 8 to 22 carbon atoms and the counterion of the salt is a member selected from the group consisting of chloride, bromide, methylsulfate, and ethylsulfate; alkylbenzyldimethylammonium salts wherein the alkyl group contains from 8 to 22 carbon atoms and the counterion of the salt is a member selected from the group consisting of chloride, bromide, methylsulfate, and ethylsulfate; alkylpyridinium salts wherein the alkyl group contains from 8 to 22 carbon atoms and the counterion of the salt is a member selected from the group consisting of chloride, bromide, methylsulfate, and ethylsulfate; and combinations thereof.

19. The core-shell particle of claim 1 wherein said core-shell particle further comprises a plurality of shell components, each disposed about said core component.

20. A latex comprising an aqueous suspension of core-shell particles of claim 1.

21. The latex of claim 20 wherein said latex has a solids content of core-shell particles in the range of about 25.0% to about 50.0%.

22. The latex of claim 21 wherein said latex has a solids content of core-shell particles in the range of about 35.0% to about 45.0%.

23. An ink jet receptive coating comprising the latex of claim 20.

24. The ink jet receptive coating of claim 23 wherein the coating further comprises a pigment.

25. The ink jet receptive coating of claim 24 wherein the pigment is a member selected from the group consisting of silica, alumina, plastic pigments, calcium carbonate, kaolin clay, and combinations thereof.

26. An ink jet printable product comprising a substrate coated on at least one side with the coating of claim 23.

27. The ink jet printable product of claim 26 wherein the substrate is a member selected from the group consisting of paper, paperboard, wood, plastic film, metal foil, textiles, and combinations thereof.

28. A latex comprising an aqueous suspension of core-shell particles of claim 1 wherein the pH of the latex is adjusted to a level in the range of about 3.5 to about 7.0 via the addition of an acid selected from the group consisting of mineral acids, water-soluble carboxylic acids, water-soluble sulfonic acids, and combinations thereof.

29. The latex of claim 28 wherein the acid is a member selected from the group consisting of acetic acid, propionic acid, glycolic acid, lactic acid, and combinations thereof.

30. The latex of claim 28 wherein said latex has a solids content of core-shell particles in the range of about 25.0% to about 50.0%.

31. The latex of claim 30 wherein said latex has a solids content of core-shell particles in the range of about 35.0% to about 45.0%.

32. An ink jet receptive coating comprising the latex of claim 28.

33. The ink jet receptive coating of claim 32 wherein the coating further comprises a pigment.

34. The ink jet receptive coating of claim 33 wherein the pigment is a member selected from the group consisting of silica, alumina, plastic pigments, calcium carbonate, kaolin clay, and combinations thereof.

35. An ink jet printable product comprising a substrate coated on at least one side with the coating of claim 32.

36. The ink jet printable product of claim 35 wherein the substrate is a member selected from the group consisting of paper, paperboard, wood, plastic film, metal foil, textiles, and combinations thereof.

* * * * *

UNITED STATES PATENT AND TRADEMARK OFFICE
CERTIFICATE OF CORRECTION

PATENT NO.     : 6,521,343 B1
DATED           : February 18, 2003
INVENTOR(S)   : Gamini S. Samaranayake, Frederick Hutter and Camille K. Stebbins It is certified that error appears in the above-identified patent and that said Letters Patent is hereby corrected as shown below:

Column 2,
Line 17, delete "poly(vinylbenzylquatemary" and insert therefor
-- poly(vinylbenzylquaternary --.

Column 6,
Line 27, delete "onehydroxyl" and insert therefor -- one hydroxyl --.

Column 7,
Line 14, delete "at least .one" and insert therefor -- at least one --.

Column 8,
Line 43, delete "methods: of" and insert therefor -- methods of --.
Line 62, delete "stericallyhindered" and insert therefor -- sterically-hindered --.

Column 10,
Line 18, delete "alkylbenzyldimethylamrnmonium" and insert therefor
-- alkylbenzyldimethylammonium --.

Column 17,
Line 53, delete "methacrylamidopropyltrimethylannmonium" and insert therefor
-- methacrylamidopropyltrimethylammonium --.

Signed and Sealed this

Twenty-fourth Day of June, 2003

JAMES E. ROGAN
*Director of the United States Patent and Trademark Office*